J. Seaman,
Harness Hook.
No. 99,957.    Patented Feb. 15, 1870.
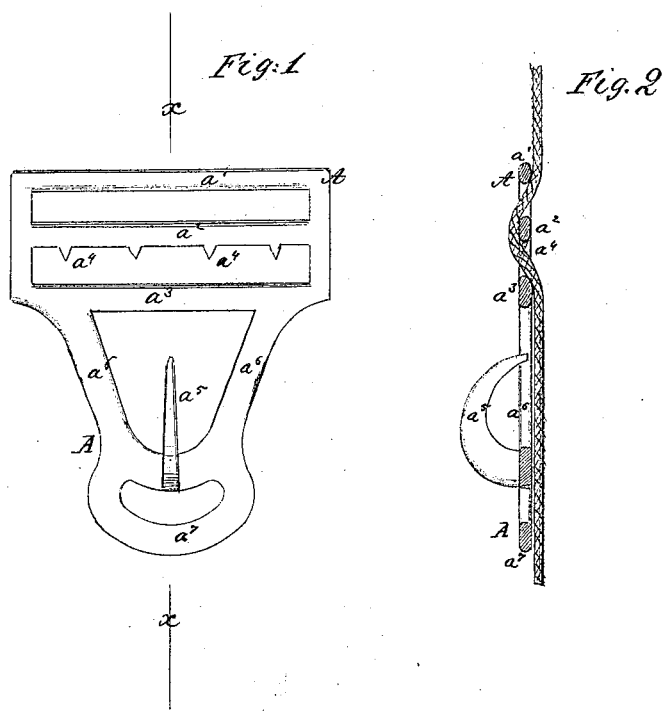
Witnesses:
A. W. Almqvist
Alex F. Roberts
Inventor:
J. Seaman
Per Munn
Attorneys.

UNITED STATES PATENT OFFICE.

JOHN SEAMAN, OF NEW YORK, N. Y.

IMPROVED HARNESS-HOOK.

Specification forming part of Letters Patent No. 99,957, dated February 15, 1870.

*To all whom it may concern:*

Be it known that I, JOHN SEAMAN, of the city, county, and State of New York, have invented a new and useful Improvement in Adjustable Plow Back-Band Hook; and I do hereby declare that the following is a full, clear, and exact description thereof, which will enable others skilled in the art to make and use the same, reference being had to the accompanying drawings, forming part of this specification, in which—

Figure 1 is a front view of my improved plow back-band hook, the back-band being detached. Fig. 2 is a detail sectional view of the same, taken through the line $x\ x$, Fig. 1, and showing it attached to the back-band.

Similar letters of reference indicate corresponding parts.

My invention has for its object to furnish an improved plow back-band hook which shall be so constructed that the length of the back-band may be easily adjusted according to the size of the animal upon which it is to be used, or to regulate the pitch of the plow, and which shall at the same time be so constructed that it will not become accidentally unhooked or catch upon the traces of the other horse; and it consists in the hook constructed as hereinafter more fully described.

A is the frame of the hook, the upper part of which is made with three cross-bars, $a^1\ a^2\ a^3$, or with two slots, through which the webbing B is passed, in the manner shown in Fig. 2. The central bar is made with rigid points or teeth $a^4$, which take hold of the webbing B, and prevent it from slipping when the hook has been adjusted in proper position. Upon the lower part of the frame of the hook A is formed a hook, $a^5$, which is curved upward and inward, so that its point may be in the plane of the side bars $a^6$ of the said frame. This construction prevents the chain from becoming accidentally unhooked, and also prevents the possibility of the hook $a^5$ catching upon the traces or harness of the other horse, which, in the case of back-band hooks constructed in the ordinary manner, is a source of very great annoyance to the plowman.

$a^7$ is a guard formed below the hook $a^5$, to prevent the chain from rubbing the horse. This is also more effectually accomplished by the lower end of the back-band B, which, with a hook constructed in accordance with my invention, passes down at the side of the horse beneath the hook, as shown in Fig. 2.

If desired, the points $a^4$ may be replaced with pivoted points or tongues, to pass through the webbing; but I prefer the construction first described, as being simpler and cheaper, and at the same time equally effective.

If desired, by forming the frame of the hook with another or fourth cross-bar, the points or teeth may be wholly omitted, as the friction will be sufficient to keep the hook A in place upon the back-band B. This construction also enables the plowman, when the band B becomes worn or broken, to replace it with a band made of sacking or other cloth which may be at hand, whereas, with the old style of back-band hooks, if either the band or the hooks became broken, the whole thing had to be thrown away.

Having thus described my invention, I claim as new and desire to secure by Letters Patent—

An improved adjustable back-band plow-hook, A, constructed and operating substantially as herein shown and described, and for the purpose set forth, as a new article of manufacture.

The above specification of my invention signed by me this 12th day of January, 1870.

JOHN SEAMAN.

Witnesses:
 GEORGE W. MABEE,
 JAMES T. GRAHAM.